United States Patent Office 2,954,913
Patented Oct. 4, 1960

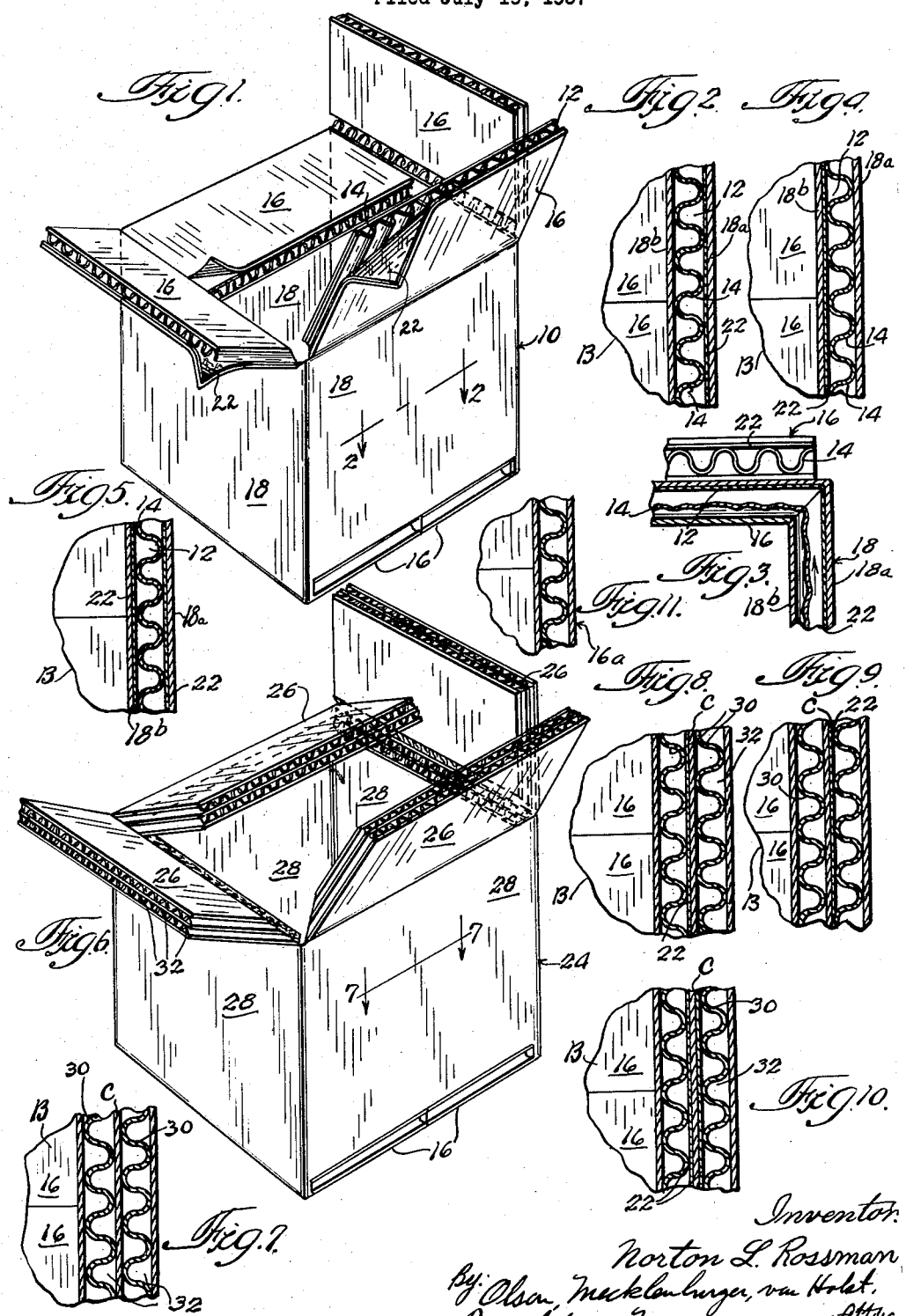

2,954,913

INSULATING CONTAINER

Norton L. Rossman, 4461 Howard, Western Springs, Ill.

Filed July 19, 1957, Ser. No. 672,942

7 Claims. (Cl. 229—14)

The present invention relates to an improved insulating container, and more particularly pertains to a container having a plurality of discrete and continuous insulating passageways interposed between the container wall surfaces.

The prior art is replete with various insulating container constructions employing various wall constructions in an attempt to provide insulation for an enclosed storage space. Many of such box constructions employ dead air spaces as the insulating medium, preventing the entrance or loss of heat relative to the contained material. Since the latter air space or spaces is noncirculating, the eventual seepage of heat soon results in the stratification of cold and hot air in the dead air space in accordance with well-known physical laws. The latter stratification, obviously, materially reduces the efficiency of the resulting container, since portions of the container storage space will be surrounded by air of varying temperatures, and uneven protection will thus be afforded to the item contained. It is well known that warm air is of less density than cold air and will thus rise over the cooler air resulting in stratification.

Those insulated containers which do disclose a continuous air space permitting circulation about the entire periphery of an enclosed storage space disclose one single air layer. As a result, such containers possess the objectionable feature that the ambient air layer will tend to be subject to localized movement resulting in a similar type stratification problem previously mentioned relative to the closed air spaces. The single air layer will have dead corners and resulting ineffective insulating properties.

It is an object of this invention, therefore, to provide an insulating container or box construction employing a plurality of discrete continuous air spaces disposed about the entire periphery of an enveloped storage space.

It is another object of this invention to provide a structural feature for insulating containers composed of corrugated material which may be adapted to a number of container types as will hereinafter be explained in greater detail.

It is a further object of this invention to provide an insulating box construction which may be readily fabricated in an economical manner from ordinary materials of construction.

The above and other objects of this invention will become more apparent from the following detailed description, when read in the light of the accompanying drawings and appended claims.

In one embodiment of the provided insulating container, a box or container defining a storage space is provided which is fabricated of corrugated cardboard, a well-known material of composition in the packaging industry. The box corrugations are arranged so that the discrete flutes or discrete passageways formed thereby may each be continuous and encompass a complete peripheral portion of the box. By continuous, it is meant that a single flute is disposed about a complete peripheral portion of the container storage space and is closed off from contact with adjacent flute passageways.

In order to assure a complete unobstructed passageway, each box flap and adjacent side portion to which the flap is hingedly connected has a V-shaped portion cut therefrom so as to form a 90 degree miter joint when the box flap is in the normal, closed position. As a result of these miter joints which are arranged at each box flap-side hinge, the discrete flutes or passageways defined by the corrugated material which flutes are interposed between two opposed paper walls of the container are continuous and unobstructed. The latter passageways are arranged transversely to the miter joints. The opposed flap distal end limits are cut so as to snugly butt in the normal closed position enabling the air spaces to be continuous across the flaps. Each corrugation passageway is thus seen to traverse two container sides and four container flaps.

The container so constructed is thus seen to comprise inner and outer wall surfaces having interposed therebetween a plurality of continuous and discrete passageways which serve as air-confining passageways. As a result, any heat transmitted or conducted through either paper wall surface into the air confined in a discrete flute, or box passageway, will result of a turbulence occasioned by the admixture of the resulting heated air with the cooler air, or conversely, by cool air with warm air housed within the passageway. This latter turbulence will result in a movement about the box periphery as the air mixture attempts to attain uniform temperature thereby resulting in high efficiency of the insulating air barrier. Because of this latter movement in the course of admixture, stratification of the insulating air barrier into hot and cold portions is obviated.

A heat-reflecting surface such as aluminum foil or similar type foil may be applied to the inner surface of either or both of the paper walls of the provided box to assist the insulating properties thereof. If the insulating container is to be used primarily for storing cold substances, the heat-reflecting surface is applied to the exterior-facing surface of the innermost wall of the box which is disposed closer to the storage space. As a result, heat attempting to penetrate the box from the exterior thereof is reflected outwardly from the latter reflecting surface. If the provided box is to be used with warm substances for the purpose of preventing the dissipation of heat, the reflecting surface is applied to the interior-facing surface of the outermost container wall disposed further from the storage area. Consequently, heat attempting to radiate from the box interior impinges against the reflecting surface and is prevented from escaping from the box interior, being reflected back into the storage space.

If it is desired to use an insulating box adaptable for use with either hot or cold substances, a foil surface is applied to the inner surface of each box wall.

In modified insulating box constructions, double thicknesses of the corrugated cardboard material may be employed utilizing the previously described miter joints or recesses at the flap-side hinge connections. As a result of these latter hinge joints, continuous air passageways are assured in both the inner and outer thicknesses of the corrugated material. The actual hinge in such box constructions comprises the outermost box wall surface which remains uncut and thus serves to hold the flap and side portions together.

Utilizing the double thickness construction it is generally unnecessary to employ a heat-reflecting surface. However, when exceptional insulating properties are desired, it may be advantageous to employ a heat-reflecting surface in conjunction with the double thickness construction when the double thickness container is to be used with cold substances, the heat-reflecting foil surface is secured to the exterior-facing surface of the central wall of the container side or flap portion. If the provided double thickness box is to be utilized with warm substances, the heat-reflecting surface is applied to the interior-facing surface of the central wall of the container side or flap portion, as will hereinafter be explained in greater detail.

For a more complete understanding of this invention, reference should now be made to the drawings, wherein Figure 1 is a perspective view of one embodiment of the illustrated box construction;

Fig. 2 is a fragmentary sectional view of the box illustrated in Fig. 1 taken on line 2—2 thereof and illustrated on a scale enlarged thereover;

Fig. 3 is a fragmentary sectional view illustrating in detail a miter joint utilized in the provided container constructions;

Fig. 4 is a fragmentary sectional view of a side of a container adapted to be used with cold substances;

Fig. 5 is a fragmentary sectional view of a side of a container which may be utilized with either cold or warm substances;

Fig. 6 is a perspective view similar to Fig. 1 of a double thickness insulating container;

Fig. 7 is a sectional view taken on line 7—7 of Fig. 6 and illustrated on a scale enlarged thereover;

Fig. 8 is a fragmentary sectional view of a side of a double thickness container to be utilized with warm substances;

Fig. 9 is a fragmentary sectional view of a side of a double thickness container to be utilized with cold substances;

Fig. 10 is a fragmentary sectional view of a double thickness insulating container construction which is adapted to be used with either cold or hot substances to be contained therein; and Fig. 11 is a fragmentary sectional view of a single thickness insulating box employing no foil.

In Fig. 2 and the other sectional views of the drawings, the letter "B" designates the container bottom.

Referring now more particularly to Fig. 1, a box construction 10 is illustrated which employs corrugated material well known in the packaging art. It will be noted that each of the passageways 12 defined by the corrugated material 14 runs continuously about an entire peripheral portion of the illustrated box and forms a discrete integral passageway when flaps 16 are in the closed position. In the latter position, the flap distal end limits are in mutually abutting relationship. It will also be apparent from Fig. 1 that one opposed pair of flaps must be arranged lower on their supporting sides than the remaining pair. In Fig. 1, the flap in the normal closed position is seen to be disposed lower than those flaps disposed transversely thereto. Thus, crushing of flap portions is obviated when all are in the normally-closed position.

Since it is desired in the provided construction that the passageways 12 formed by the corrugations 14 be continuous in nature, hinge joints between the flaps 16 and sides 18 of the illustrated box construction 10 have a V-shaped portion cut from the inner surface thereof so as to enable the flap-wall joints to define a right angle as illustrated in Fig. 3. These latter miter joints eliminate any crushing and resulting obstruction of the individual passageways 12 disposed about the box periphery upon closing the box. The miter joints illustrated are intended to be used in every box construction made in accordance with the teaching of this invention.

Such hinge joints assure freedom of air movement within each of the passageways 12 and insure the absence of air-flow obstructions. It will also be noted from Figs. 1 and 2 that each side 18 and flap 16 of the provided container 10 is defined by opposed wall surfaces 18a and 18b having the corrugated material 14 disposed therein. The corrugations of the latter material define the passageways 12.

A heat-reflecting surface composed of aluminum foil or the like may be utilized in conjunction with passageways 12 and the air contained therein for insulating purposes. The heat-reflecting surface 22 may be secured to the interior-facing surface of the outermost wall 18a as illustrated in Figs. 1 and 2. Such a side or flap construction is primarily intended for use with warm substances, the heat of which is to be retained. The reflecting surface 22 reflects the radiating heat from the container interior back into the container, thereby preventing the loss thereof. The insulating box 10 may not employ foil in its flaps or sides, as illustrated by box section 16a illustrated in Fig. 11.

It is thus seen that the container illustrated in Fig. 1 may be possessed of two insulating features. The heat-reflecting surface tends to reduce loss by heat radiation by reflecting the heat back into the container. The continuous passageways 12 which are unobstructed as a result of the miter joints, one of which is clearly illustrated in Fig. 3, prevent the stratification of the air contained in each of the passageways 12 thereby rendering most efficient the insulating properties of the air disposed between the opposed wall surfaces 18a and 18b. Since each passageway 12 is continuous, the air contained within each passageway will tend to be uniform in temperature upon the gain or loss of heat in the container illustrated in Fig. 1.

Stratification of hot and cold air portions within any one passageway 12 is impossible, since if a temperature differential exists movement of the warmer air toward the colder will take place, resulting in intimate admixture of all air within a particular passageway. Thus, the enclosed material in the insulated box is surrounded by air segments of uniform temperatures. Such uniform insulation would not be afforded if the discrete passageways 12 did not possess the miter joints most clearly illustrated in Fig. 3. In the absence of such joints the removed cardboard material, if present, would be crushed obstructing each of the passageways 12. Consequently, air would not be able to circulate about a complete peripheral portion of the box 10. The effectiveness of the provided box 10 is thus seen to be owing to the optional reflecting surface 22 as well as the miter joint in the connection between the box flaps 16 and the box sides 18.

It is apparent that if a container such as container 10 illustrated in Fig. 1 is to be utilized with cold substances the heat-reflecting surfaces would be rearranged so as to be disposed on the exterior-facing surface of the innermost wall surface 18b in the manner illustrated in Fig. 4. In such location, the reflecting surface opposes the admission of exterior heat into the container interior by reflecting the same outwardly.

In Fig. 5 a heat-reflecting layer 22 is illustrated secured to the inner surface of both wall surfaces 18a and 18b. Such a construction is thus adaptable for use with either cold or hot substances.

Fig. 6 is a perspective view of a modified insulating box construction 24 which has flaps 26 and sides 28 of double thickness. Obviously, the insulating properties afforded by a double layer of the enclosed air passageways are superior to a box such as that illustrated in Fig. 1 having a single thickness. It will be noted from Fig. 6 that the flap-side hinge connection or joint is mitered similarly to the box construction of Fig. 1 so that, when the box 24 is in the normal closed position, corrugated material 30, more clearly seen in the sectional view of Fig. 7, will form a plurality of continuous passageways 32 which pass about an entire peripheral portion of the box. The double layer of passageways 32 are unobstructed and insure temperature uniformity of the air within any one passageway 32.

Figs. 8 through 10 illustrate sections of container sides employing double thicknesses which may utilize a heat-reflecting surface to assist in the insulating capacity afforded by the box with which they are employed. (The same construction of the sides is, of course, utilized in the flap portions.) Although box 24 employs no foil surface, such foil may be utilized in the manner illustrated in Fig. 8 when exceptional insulation is to be afforded a contained, warm material. Under such circumstances, the foil layer 22 is applied to the interior-facing surface of the center wall C, as illustrated in Fig. 8. Utilizing such construction, two layers of discrete, continuous air passages surround the enclosed material in addition to the optional heat-reflecting surfaces.

In Fig. 9 a heat-reflecting surface 22 is disposed on the exterior-facing surface of the center wall C of the illustrated box section. It is apparent, therefore, that heat from the exterior of the box will be reflected outwardly by the latter reflecting surface.

In Fig. 10, a double thickness container construction is illustrated in which a heat-reflecting surface 22 is applied to both surfaces of the center wall C of the illustrated box section. Such a walled construction will afford excellent insulating protection for either a hot or cold substance.

A number of box constructions have been provided which utilize discrete passageways containing insulating air which is allowed to circulate about a complete peripheral portion of the provided box. As a result, the insulating air may move and mix when necessary upon the gain or loss of heat, thereby assuring an entrapped air column of substantially uniform temperature. The continuous air passageways are made possible by the miter joints above described and illustrated in the drawings. The continuous air passageways are also provided by arranging all container side-flap hinges or folds transverse to the longitudinal axes of the discrete passageways formed by the corrugations. The latter disposition enables each passageway to completely travel about two sides and four container flap portions. The optional heat-reflecting surfaces above described may also be used in conjunction with the continuous air passageways in the course of providing the utmost in insulating efficiency.

It is believed apparent that many modifications may be made in the illustrated embodiments of this invention which will not depart from the spirit and scope of this invention. It is apparent, for instance, that the configuration of the insulating container is immaterial. The important structural feature comprises the continuous air passageways arranged about complete peripheral portions of the container. The number of thicknesses of the insulating container is not limited to one or two as illustrated but may be indefinite in number, the only governing principle being that the flap-wall mitered joints allow each of the air passageways defined by the corrugations to be continuous in nature. It is intended, therefore, that the invention be limited by the scope of the appended claims.

I claim:

1. An insulating container comprising flap and side portions defining an enclosed storage space, wall portions defining opposed surfaces of said flap and side portions, means defining discrete continuous unobstructed passageways between said opposed wall portions of said flap and side portions, each of said passageways being arranged about a complete peripheral portion of said container when in the normal closed condition.

2. The container as recited in claim 1 in which said flap and side wall portions are paper sheets and said passageway defining means is corrugated cardboard.

3. The container as recited in claim 1 in which said passageway defining means is arranged in a plurality of superposed layers, each layer having opposed wall portions.

4. The container as recited in claim 3 in which a heat-reflecting surface is secured to the surface of at least one of the two wall surfaces directly opposed and adjacent to the two exposed wall portions of the container.

5. The container as recited in claim 1 in which a heat-reflecting surface is secured to the inner surface of at least one of said opposed flap and side wall portions.

6. The insulating container as recited in claim 1 in which the continuous, unobstructed passageways of said wall portions are vertically disposed in the normal container position of use.

7. An insulating container having opposed wall surfaces defining container sides and flaps, said flaps being hingedly engaged to said sides, discrete unobstructed passageways disposed between said wall surfaces, said side and flap hinge engagements defining miter joints in the normal closed condition, said passageways being arranged transverse to the line of juncture between said flaps and sides whereby said passageways may be continuous and unobstructed through said miter joints when said container is in the normal closed condition, each of said passageways encompassing an entire peripheral portion of said container.

References Cited in the file of this patent

UNITED STATES PATENTS

| | | |
|---|---|---|
| 1,449,409 | Hunt | May 27, 1923 |
| 1,713,348 | O'Brien | May 14, 1929 |
| 1,825,068 | Jones et al. | Sept. 29, 1931 |
| 2,031,254 | Derr | Feb. 18, 1936 |
| 2,278,782 | Harvey et al. | Apr. 7, 1942 |